(12) United States Patent
Hoeg (10) Patent No.: US 9,275,426 B2
(45) Date of Patent: Mar. 1, 2016

(54) METHOD AND APPARATUS FOR UNIFYING GRAPHICS PROCESSING UNIT COMPUTATION LANGUAGES

(75) Inventor: Steven Paterson Hoeg, Waterloo, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 382 days.

(21) Appl. No.: 13/487,653

(22) Filed: Jun. 4, 2012

(65) Prior Publication Data

US 2013/0321436 A1    Dec. 5, 2013

(51) Int. Cl.
*G06T 1/00*     (2006.01)
*G06F 9/45*     (2006.01)

(52) U.S. Cl.
CPC ........................................ *G06T 1/00* (2013.01)

(58) Field of Classification Search
CPC ..................................... G06T 1/00; G06T 1/20
See application file for complete search history.

(56) References Cited

U.S. PATENT DOCUMENTS

| | | | | |
|---|---|---|---|---|
| 6,317,871 | B1 * | 11/2001 | Andrews et al. | 717/137 |
| 2005/0012749 | A1 * | 1/2005 | Gonzalez et al. | 345/522 |
| 2006/0265258 | A1 * | 11/2006 | Powell et al. | 705/7 |
| 2008/0109795 | A1 * | 5/2008 | Buck et al. | 717/137 |
| 2011/0035736 | A1 | 2/2011 | Stefansson et al. | |
| 2013/0159982 | A1 * | 6/2013 | Lerios | 717/146 |

OTHER PUBLICATIONS

A. Munshi, "The OpenCL Specification", Version 1.0, Document Revision: 43, Khronos OpenCL Working Group, May 16, 2009, p. 1-12 and 125-134.*
Gabriel Martinez, Mark Gardner and Wu-chun Feng, "CU2CL: A CUDA-to-OpenCL Translator for Multi- and Many-core Architectures," 2011 IEEE 17th International Conference on Parallel and Distributed Systems, pp. 300-307.*
Christian Siegl et al., "OpenCL, a Viable Solution for High-performance Medical Image Reconstruction?", 9 pgs., Mar. 16, 2011.
Sreepathi Pai et al., "Plasma: Portable Programming for SIMD Heterogeneous Accelerators", Supercomputer Education and Research Centre, Indian Institute of Science, 10 pgs., Jan. 9, 2010.
Marcus Huntemann et al., Single Scattering of Aspherical Particles in DDA Calculations on GPUs Using OpenCL, Jan. 14, 2011, 14 pgs.

* cited by examiner

*Primary Examiner* — Sing-Wai Wu
(74) *Attorney, Agent, or Firm* — Keller Jolley Preece (57) ABSTRACT

A method and apparatus for unifying graphics processing unit (GPU) computation languages is disclosed. The method comprises identifying a GPU of a computer system; accessing a plurality of macros representing a difference in source code between a first GPU computation language and a second GPU computation language, expanding each macro in the plurality of macros based on the identified GPU and executing a kernel on the computer system using the expanded macro.

20 Claims, 3 Drawing Sheets

METHOD AND APPARATUS FOR UNIFYING GRAPHICS PROCESSING UNIT COMPUTATION LANGUAGES

BACKGROUND OF THE INVENTION

1. Field of the Invention

Embodiments of the present invention generally relate to computer graphics processing, and more particularly, to a method and apparatus for unifying graphics processing unit computation languages.

2. Description of the Related Art

A graphics processing unit (GPU) is a processor optimized for accelerating computer graphics. GPU computation languages have been developed for rendering the GPUs on specific hardware and/or software platforms.

For example, a GPU method for rendering computer graphics built on NVIDIA's Compute Unified Device Architecture (CUDA) technology can only run on the NVIDIA hardware platform, while Open Computing Language (OpenCL) is a GPU computing language that may run on multiple platforms. In order to allow platform independent application and integration of GPUs having a platform dependency, the GPU's computation language platform dependency must be overcome.

One solution which would allow platform independent application and integration of the CUDA and OpenCL computing languages, for example, is to maintain parallel OpenCL and CUDA code bases. However, this solution requires a massive amount of duplicated code that becomes difficult to maintain. Another solution is to develop a new language or compiler that facilitates use of the functionality of both OpenCL and CUDA. However, this requires a significant commitment of time and expense to develop and test the new language. Another solution is to support only OpenCL, but that would require abandoning a significant amount of existing and well-tested CUDA code. Also, CUDA allows certain functionality on NVIDIA hardware, which functionality is not available through OpenCL.

Therefore, there is a need for a method and apparatus for unifying GPU computation languages.

SUMMARY OF THE INVENTION

The present invention provides a method and apparatus for unifying graphics processing unit computation languages. In one embodiment, the method comprises identifying a GPU on a computing device and accessing a plurality of macros representing a difference in source code between a first GPU computation language and a second GPU computation language. The method expands each macro based on the identified GPU and executes a kernel on the computing device using the expanded macro.

While the method and apparatus is described herein by way of example for several embodiments and illustrative drawings, those skilled in the art will recognize that the method and apparatus for unifying graphics processing unit computation languages are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for unifying graphics processing unit computation languages as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "video" refers generally to any multi-media object or data, and although in various embodiments of the invention may refer to only a video object (still, animated or moving), in other embodiments, may refer to a combination of both video and audio objects or an audio object alone.

DETAILED DESCRIPTION OF EMBODIMENTS

Embodiments of the present invention comprise a method and apparatus for unifying GPU computation languages. The embodiments identify the GPU of a computer system. The method then accesses macros that represent a difference in source code between a first GPU computation language and a second GPU computation language. The embodiments expand the macros based on the identified GPU and execute a kernel using the expanded macros.

In the present invention, a macro contains source code for both the first GPU computation language and the second GPU computation language along with instructions for when each piece of source code is to be used. A computer program, also called a kernel, contains tokens. Each token is a placeholder that corresponds to a macro. Macro expansion is a term which describes the process of substituting one or more lines of source code from a macro in place of the corresponding token in the kernel.

The following is a simple example to illustrate what happens in a macro expansion. A kernel is written to perform a function on a computer, for example, to print a poster. The poster can be printed in multiple languages. The title of the poster must be translated into one of the multiple languages before it is printed. The kernel may be written in such a way that it need not contain every translation. The kernel need only be written with a token that, upon execution, will access a macro. The macro will provide the appropriate substitution during macro expansion. For example, the kernel contains a placeholder token named TRANSLATE_TITLE. When the kernel is executed, a TRANSLATE_TITLE macro is accessed and the TRANSLATE_TITLE macro is expanded. That is, the token TRANSLATE_TITLE in the kernel is replaced with a substitute (local) value defined in the expanded macro. For English, the TRANSLATE_TITLE token will be replaced with, "My Poster" as the substitute value. For Spanish, the TRANSLATE_TITLE token will be replaced with, "Mi Cartel" as the substitute value. However, rather than simply replacing a token with a substitute value, the present invention replaces the token with CUDA or OpenCL code.

Although the present disclosure describes the invention in terms of CUDA and OpenCL GPU Computation Languages, the present invention may be used to unify two or more GPU computation languages derived from a common programming language, such as C++.

Because CUDA and OpenCL are both programming languages derived from the C programming language, there are many similarities in the code bases. Embodiments of the present invention define a compatibility layer in the source code of a kernel. The compatibility layer of the source code contains tokens, such as TRANSLATE_TITLE in the previous example. Macros are defined, which contain language specific source code that will replace these tokens in the compatibility layer. The macros represent the specific differences between the code bases of the two GPU computation languages. When the kernel is executed, the macro is expanded. As described above, macro expansion is a term which describes the process of substituting one or more lines of source code from a macro in place of the corresponding token in the kernel. The specific code for the appropriate GPU language, which is contained in the macro, is substituted into the place where the token had been located in the source code. Whether the macro is expanded for running in a CUDA environment and/or expanded for running in an OpenCL environment, the macro defines a specific behavior in the GPU.

Embodiments of the present invention provide a method and apparatus for unifying GPU computation languages. Advantageously, there is no need to maintain separate code bases or separate compilers.

Various embodiments of an apparatus and method for unifying graphics processing unit computation languages are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. As described herein, an algorithm is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
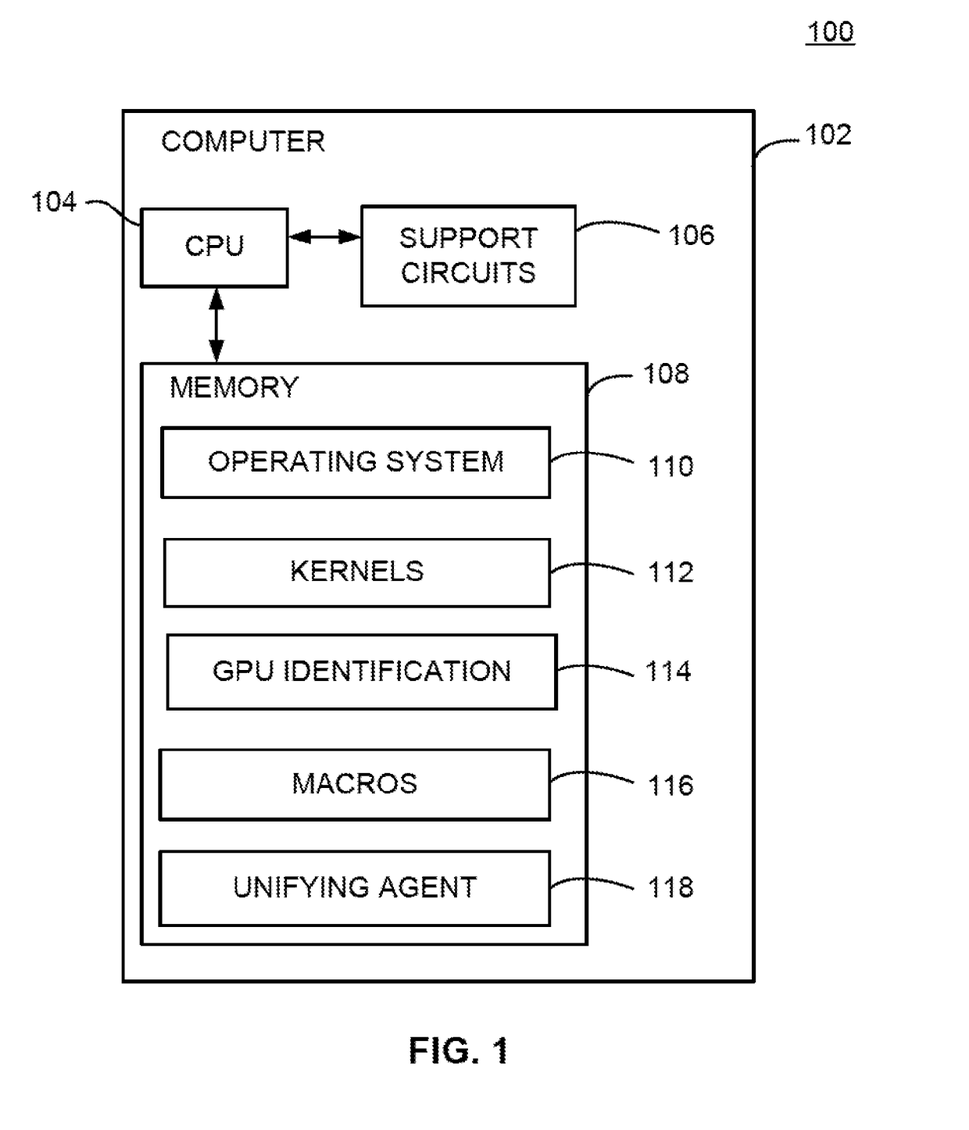
FIG. 1 a block diagram of a system for unifying graphics processing unit computation languages, according to one or more embodiments of the invention.

FIG. 1 depicts a block diagram of a system 100 for unifying graphics processing unit (GPU) computation languages, according to one or more embodiments of the invention. The system 100 represents a computer 102. The system 100 uses a plurality of macros 116 for unifying GPU computation languages based on the identification of the GPU utilized by computer 102.

The computer 102 comprises a CPU 104, support circuits 106, and a memory 108. The computer 102 is a type of computing device (e.g., a laptop, a desktop, a Personal Digital Assistant (PDA) and/or the like). The CPU 104 may comprise one or more commercially available microprocessors or microcontrollers that facilitate data processing and storage. The various support circuits 106 facilitate the operation of the CPU 104 and include a GPU, one or more clock circuits, power supplies, cache, input/output circuits, displays, and the like. The memory 108 comprises at least one of Read Only Memory (ROM), Random Access Memory (RAM), disk drive storage, optical storage, removable storage and/or the like. The memory 108 comprises an operating system (OS) 110, a plurality of kernels 112, a unifying agent 118, a plurality of macros 116 and a GPU identification 114.

According to some embodiments of the invention, the operating system 110 generally manages various computer resources (e.g., network resources, file processors, and/or the like). The operating system 110 is configured to execute operations on one or more hardware and/or software modules, such as Network Interface Cards (NICs), hard disks, virtualization layers, firewalls and/or the like. Examples of the operating system 110 may include, but are not limited to, Linux, Mac OSX, BSD, UNIX, Microsoft Windows, and the like.

According to some embodiments, the unifying agent 118 unifies GPU computational languages as described with respect to FIG. 2 below. The unifying agent 118 accesses macros. In some embodiments the macros 116 represent a difference in source code between computation languages, for example, a difference between a first GPU computation language and a second GPU computation language. According to an embodiment, the first GPU computational language is Compute Unified Device Architecture (CUDA) and the second GPU computational language is Open Computing Language (Open CL). The unifying agent 118 identifies the GPU. The GPU identification 114 is obtained by determining whether the hardware of the computer 102 is CUDA-based or OpenCL-based. In some embodiments, CUDA runs NVIDIA hardware, whereas OpenCL runs on non-NVIDIA hardware. NVIDIA hardware does not understand a program that is written in OpenCL and non-NVIDIA hardware does not understand a program that is written in CUDA.

The macros 116 define differences in the source code between the GPU languages. For example, a first GPU language may require a certain syntax to start a program, for example, syntaxA. A second GPU language may require a different syntax to start a program, for example, syntaxB. A macro 116 will contain instructions for when to use syntaxA and when to use syntaxB. A kernel 112 is a function that runs on the computer 102 and accesses a macro 116. The kernel 112 has a compatibility layer written into its source code. The compatibility layer contains tokens, sometimes referred to as placeholders. For example, a token may be called "START PROGRAM". When the kernel is executed, the unifying agent 118 expands the macro START_PROGRAM based on the identified GPU. As described above, macro expansion is a term which describes the process of substituting one or more lines of source code from a macro in place of the corresponding token in the kernel. The macro 116 provides instructions to replace the START_PROGRAM token in the kernel with syntaxA in the first GPU environment and to replace the START_PROGRAM token with syntaxB in the second GPU environment. Thus, only one kernel needs to be written to perform a function in either GPU environment, by expanding a macro to reconcile the differences in the GPU computation languages.

Figure 2:
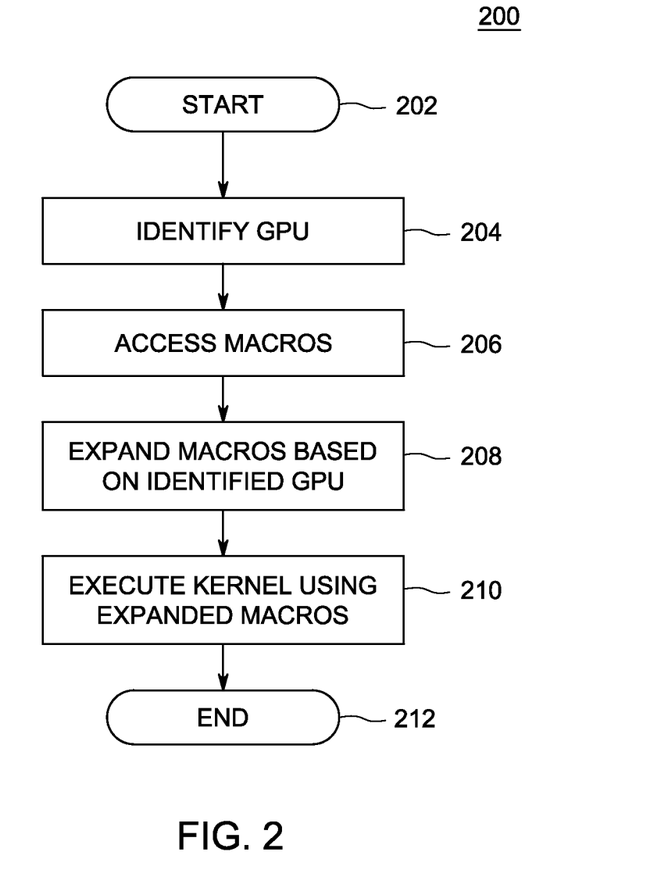
FIG. 2 depicts a flow diagram of a method for unifying graphics processing unit computational languages as performed by the unifying agent of FIG. 1, according to one or more embodiments of the invention.

FIG. 2 depicts a flow diagram a method 200 for unifying graphics processing unit computational languages as performed by the unifying agent 118 of FIG. 1, according to one or more embodiments of the invention. The method 200 is invoked when the kernel is executed, for example, when a user initiates play of a video game.

The method 200 identifies the GPU on the computer and accesses macros created to resolve the language-specific differences, depending on what GPU is being targeted. The macros will be expanded based on the identified GPU. The macros represent a difference in source code between computation languages, for example, a difference between a first GPU computation language and a second GPU computation language. According to one embodiment, the first GPU computational language is Compute Unified Device Architecture (CUDA) and the second GPU computational language is Open Computing Language (Open CL).

The method 200 starts at step 202, and proceeds to step 204. At step 204, the method 200 identifies the GPU. The GPU is identified by determining, for example, whether hardware of the computer on which the application is running is CUDA-based or OpenCL-based. Determining the type of graphics card present on a computer identifies the GPU. In some embodiments, the type of graphics card present is automatically detected. In some embodiments, the type of graphics card present is determined by running a utility program that returns the type of graphics card that is present. The method 200 proceeds to step 206.

At step 206 the method 200 accesses a plurality of macros. The macros define differences in the source code between the GPU languages and provide instructions for when each is to be utilized. Each macro corresponds to at least one token in the kernel. The method 200 proceeds to step 208. At step 208, the method 200 expands the macros based on the identified GPU. The method 200 expands the macros when the kernel is executed. As described above, macro expansion is a term which describes the process of substituting one or more lines of source code from a macro in place of the corresponding token in the kernel. When the kernel is executed on the computer and the identified GPU is OpenCL, all of the tokens in the kernels are substituted with OpenCL source code found in the macros. Once substitution is complete, all of the kernels are now written in OpenCL. Conversely, if the identified GPU is CUDA, all of the tokens in the kernels are substituted with CUDA source code found in the macros, resulting in all of the kernels now being written in CUDA source code.

As will be evident in the following description, when executed in a CUDA environment, a GF_KERNEL macro is expanded using the part of the macro defined for CUDA. When compiling in an OpenCL environment, the GF_KERNEL macro is expanded using the part of the macro defined for OpenCL. The following GF_KERNEL defines a point of entry in a kernel which executes on a GPU. It essentially is the term for "start". However, when starting a kernel in CUDA, "_global_void" denotes the meaning "start" and in OpenCL, "_kernel void" denotes the meaning "start". Although much of the rest of the source code is the same, the "start" phrase must be reconciled based on the GPU in which it is to be compiled. When the macro is expanded for CUDA, the GF_KERNEL token is replaced by "_global_void". When the macro is expanded in OpenCL, the GF_KERNEL token is replaced by "_kernel void".

The macro GF_KERNEL is defined below. The macro denotes a CUDA_global_function or an OpenCL_kernel.

```
#if GF_DEVICE_TARGET_CUDA || GF_DEVICE_TARGET_HOST
#define GF_KERNEL extern "C" _global_ void
#else
"#define GF_KERNEL _kernel void\n"
#endif
```

The following is an example of a kernel for sharpening an image, that uses the GF_KERNEL macro from above:

```
GF_DEVICE_SECTION(
GF_CUDA_TEXTURE(float4, inSrcTexture)
/*
**
*/
GF_KERNEL SharpenKernel(
    GF_OPENCL_TEXTURE(inSrcTexture),
    GF_PTR(float4) outDest,
    int inPitch,
    DevicePixelFormat inDeviceFormat,
    int inWidth,
    int inHeight,
    float inCenterCoeff,
    float inSurroundCoeff)
{
    int x = KernelX( );
    int y = KernelY( );
    if (x < inWidth && y < inHeight)
    {
        PixelRGB up = GF_READTEXTUREPIXEL(inSrcTexture,x+0.5f,
y-0.5f,  CLK_NORMALIZED_COORDS_FALSE |
CLK_ADDRESS_CLAMP_TO_EDGE | CLK_FILTER_NEAREST);
        PixelRGB left = GF_READTEXTUREPIXEL(inSrcTexture,
x-0.5f, y+0.5f, CLK_NORMALIZED_COORDS_FALSE |
CLK_ADDRESS_CLAMP_TO_EDGE | CLK_FILTER_NEAREST);
        PixelRGBcente r= GF_READTEXTUREPIXEL(inSrcTexture,
x+0.5f, y+0.5f, CLK_NORMALIZED_COORDS_FALSE |
CLK_ADDRESS_CLAMP_TO_EDGE | CLK_FILTER_NEAREST);
        PixelRGB right = GF_READTEXTUREPIXEL(inSrcTexture,
x+1.5f, y+0.5f, CLK_NORMALIZED_COORDS_FALSE |
CLK_ADDRESS_CLAMP_TO_EDGE | CLK_FILTER_NEAREST);
        PixelRGB down = GF_READTEXTUREPIXEL(inSrcTexture,
x+0.5f, y+1.5f, CLK_NORMALIZED_COORDS_FALSE |
CLK_ADDRESS_CLAMP_TO_EDGE | CLK_FILTER_NEAREST);
        PixelRGB surround = AddPixels(AddPixels(AddPixels(up, left),
right), down);
        surround = MultiplyPixel(surround, inSurroundCoeff);
        center = MultiplyPixel(center, inCenterCoeff);
        PixelRGB result = AddPixels(center, surround);
        result = DividePixel(result, inCenterCoeff + 4*inSurroundCoeff);
        WriteRGBPixel(result, outDest, inPitch, inDeviceFormat, x, y);
    }
}
)
```

Hence, the line in the code above that reads GF_KERNEL SharpenKernel(will read "_global_void SharpenKernel(" in CUDA after macro expansion, but will read "_kernel void Sharpen Kernel(" in OpenCL after macro expansion.

Therefore, only one kernel is written, but the kernel runs different code depending on the specific GPU that is identified. In some instances, where the code bases for the two GPU computation languages are so divergent and share little common code, separate piece of code are maintained for each GPU language. In the example above, the way to define texture in CUDA is so different from the way texture is defined in OpenCL, that the GF_CUDA_TEXTURE macro and the GF_OPENCL_TEXTURE macro are maintained separately. When the GF_CUDA_TEXTURE macro is expanded, CUDA source code will replace the GF_CUDA_TEXTURE token but the macro will not contain OpenCL source code (thereby replacing the GF_CUDA_TEXTURE token with a blank, or null value in OpenCL). Conversely when the GF_OPENCL_TEXTURE macro is expanded, OpenCL source code will replace the GF_OPENCL_TEXTURE token but the macro will not contain CUDA source code (thereby replacing the GF_OPENCL_TEXTURE token with a blank, or null value in CUDA).

The method 200 proceeds to step 210. At step 210, the method 200 executes the kernel using the expanded macros. Once the macro expansion from step 208 is complete, the method 200 compiles the kernels, thereby translating them into executable code and finally, executes the compiled kernels on the computer. The method 200 proceeds to step 210 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 3:
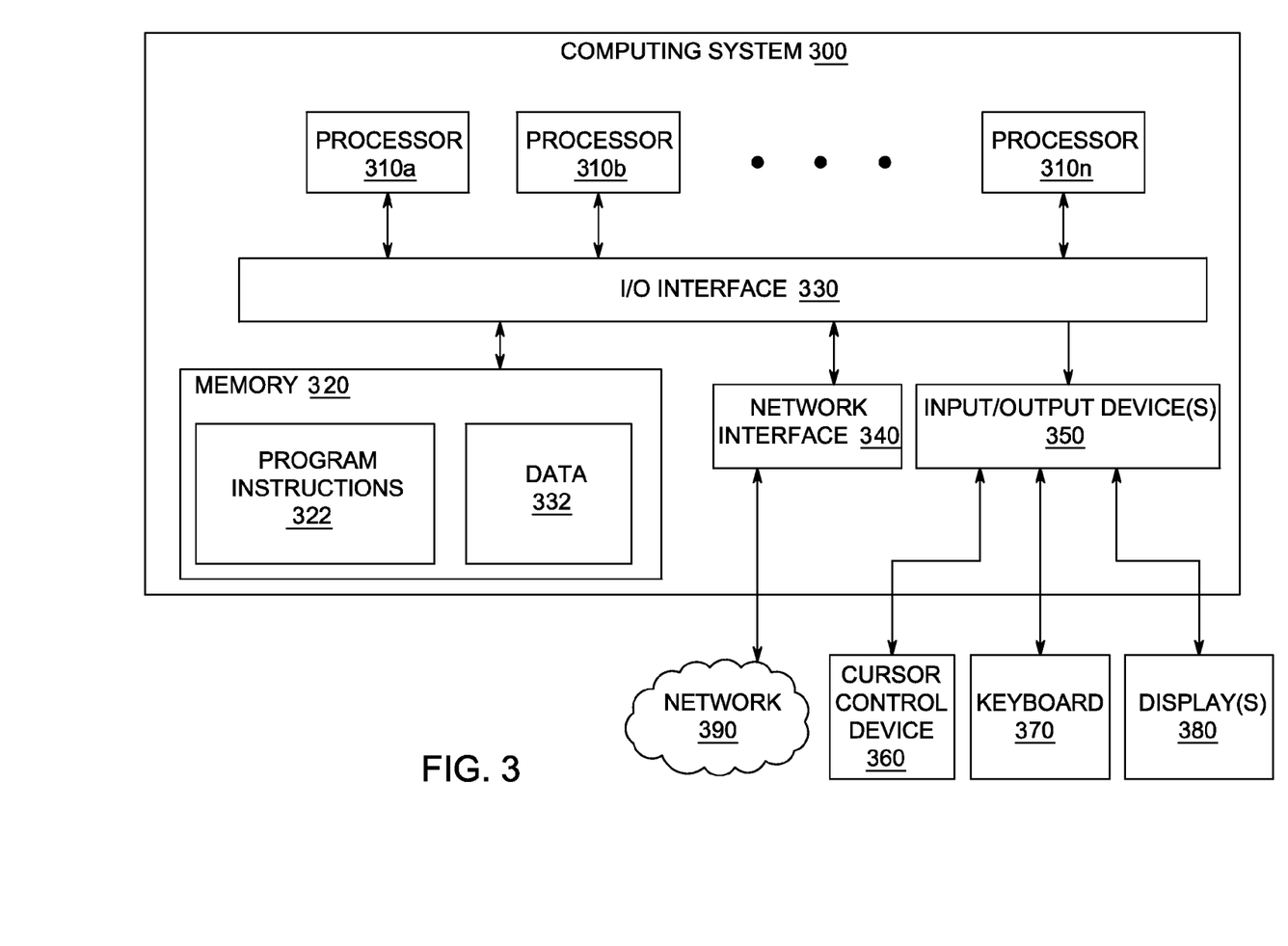
FIG. 3 depicts a computer system that can be utilized in various embodiments of the present invention, according to one or more embodiments of the invention.

FIG. 3 depicts a computer system that can be used to implement the methods of FIGS. 1-2 in various embodiments of the present invention, according to one or more embodiments of the invention. FIG. 3 depicts a computer system that can be utilized in various embodiments of the present invention to implement the computer 102, according to one or more embodiments.

Various embodiments of method and apparatus for unifying graphics processing unit computation languages, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement method 200, as processor-executable executable program instructions 322 (e.g., program instructions executable by processor(s) 310) in various embodiments.

In the illustrated embodiment, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of components may be utilized by the system to receive user input described above. In various embodiments, a user interface (e.g., user interface) may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs), such as the x96, PowerPC, SPARC, or MIPS ISAs, or any other suitable ISA. In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350, In some embodiments, I/O interface 330 may perform any necessary protocol, timing or other data transformations to convert data signals from one components (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touch pads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for unifying Graphics Processing Unit (GPU) computation languages comprising:
    initiating, by at least one processor, execution of an application on a computing device;
    in response to initiating execution of the application, running a utility program to identify a computation language associated with a GPU on the computing device, wherein the GPU is associated with a first GPU computation language or a second GPU computation language;
    wherein the first GPU computation language includes source code which is not present in the second GPU computation language, and
    wherein the second GPU computation language includes source code that is not present in the first GPU computation language;
    accessing a plurality of macros, wherein each macro of the plurality of macros comprises source code in the first GPU computation language and source code in the second GPU computation language;
    expanding each macro in the plurality of macros based on the identified computation language associated with the GPU;
    compiling, based on the expanded plurality of macros, a kernel using source code in the identified computation language associated with the GPU; and
    executing the kernel on the computing device.

2. The method of claim 1, wherein the first GPU computation language and the second GPU computation language share code base similarities derived from a common programming language, and wherein each of the plurality of macros corresponds to a difference between a code base of the first GPU computation language and a code base of the second GPU computation language.

3. The method of claim 1, wherein the first GPU computation language is Compute Unified Device Architecture (CUDA) and the second GPU computation language is Open Computing Language (OpenCL).

4. The method of claim 1, wherein each macro of the plurality of macros represents a difference between the first GPU computation language and the second GPU computation language.

5. The method of claim 3, wherein running a utility program to identify a computation language associated with a GPU comprises determining whether a computer hardware is CUDA-based or OpenCL-based.

6. The method of claim 1, wherein expanding each macro comprises substituting language specific code into the kernel wherein the language specific code is compatible with the identified GPU.

7. The method of claim 6 wherein the kernel contains tokens where the language specific code is to be substituted.

8. A non-transitory computer readable medium for storing computer instructions that, when executed by at least one processor cause the at least one processor to perform a method for unifying Graphics Processing Unit (GPU) computation languages, the method comprising:
    initiating execution of an application on a computing device;
    in response to initiating execution of the application, running a utility program to identify a computation language associated with a GPU on the computing device, wherein the GPU is associated with a first GPU computation language or a second GPU computation language;
    wherein the first GPU computation language includes source code which is not present in the second GPU computation language, and
    wherein the second GPU computation language includes source code that is not present in the first GPU computation language;
    accessing a plurality of macros, wherein each macro of the plurality of macros comprises source code in the first GPU computation language and source code in the second GPU computation language;
    expanding each macro in the plurality of macros based on the identified computational language associated with the GPU;
    compiling, based on the expanded plurality of macros, a kernel using source code in the identified computation language associated with the GPU; and
    executing the kernel on the computing device.

9. The computer readable medium of claim 8, wherein the first GPU computation language and the second GPU computation language share code base similarities derived from a common programming language, and wherein each of the plurality of macros corresponds to a difference between a code base of the first GPU computation language and a code base of the second GPU computation language.

10. The computer readable medium of claim 8, wherein the first GPU computation language is Compute Unified Device Architecture (CUDA) and the second GPU computation language is Open Computing Language (OpenCL).

11. The computer readable medium of claim 8, wherein running a utility program to identify a computation language associated with a GPU comprises determining whether a computer hardware is CUDA-based or OpenCL-based.

12. The computer readable medium of claim 8, wherein expanding each macro comprises substituting language specific code into the kernel wherein the language specific code is compatible with the identified GPU.

13. The computer readable medium of claim 12, wherein the kernel contains tokens where the language specific code is to be substituted.

14. An apparatus for unifying Graphics Processing Unit (GPU) computation languages comprising at least one processor, a memory operatively associated with the at least one processor and having stored therein instructions executable by the at least one processor, wherein the instructions, when executed by the at least one processor, cause the apparatus to:
    initiate execution of an application;

in response to initiating execution of the application, run a utility program to identify a computation language associated with a GPU on the computing device, wherein the GPU is associated with a first GPU computation language or a second GPU computation language;

wherein the first GPU computation language includes source code which is not present in the second GPU computation language, and wherein the second GPU computation language includes source code that is not present in the first GPU computation language;

access a plurality of macros stored in memory, wherein each macro of the plurality of macros comprises source code in the first GPU computation language and source code in the second GPU computation language;

expand each macro in the plurality of macros based on the identity of the identified GPU; and execute a kernel using the expanded macro;

wherein the first GPU computation language and the second GPU computation language share code base similarities derived from a common programming language, and wherein each of the plurality of macros corresponds to a difference between a code base of the first GPU computation language and a code base of the second GPU computation language.

15. The apparatus of claim 14, further comprising compiling, based on the expanded plurality of macros, the kernel using source code in the identified computation language associated with the GPU.

16. The apparatus of claim 14, wherein the first GPU computation language is Compute Unified Device Architecture (CUDA) and the second GPU computation language is Open Computing Language (OpenCL).

17. The apparatus of claim 14, wherein the kernel is configured to execute operations on one or more hardware and/or software modules responsive to execution of the kernel using the expanded macro.

18. The apparatus of claim 16, wherein the instructions, when executed by the at least one processor, further cause the apparatus to identify a computation language associated with the GPU by determining whether a computer hardware is CUDA-based or OpenCL-based.

19. The apparatus of claim 18, wherein the instructions, when executed stored in memory and executable by the at least one processor, further cause the apparatus to expand each macro by substituting language specific code into the kernel, wherein the language specific code is compatible with the identified computation language associated with the GPU.

20. The apparatus of claim 14, wherein the kernel contains tokens where the language specific code is to be substituted.

* * * * *